Patented Apr. 6, 1954

2,674,598

UNITED STATES PATENT OFFICE 2,674,598

2-AMINO-4-METHYL-6-ALKYLAMINO-PYRIMIDINES AND SALTS THEREOF

Lucas P. Kyrides, Zeeland, Mich., and Ferdinand B. Zienty, Brentwood, Mo., assignors to Monsanto Chemical Company, St. Louis, Mo., a corporation of Delaware No Drawing. Application January 17, 1952,
Serial No. 266,998

7 Claims. (Cl. 260—256.4)

This invention relates to new compositions of matter. More particularly it relates to 2-amino-4-methyl-6-alkylamino-pyrimidines of the general formula

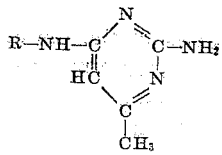

where R is an acyclic hydrocarbon radical having 8 to 18 carbon atoms, and salts thereof with acids. Typical examples of R comprise octyl, nonyl, decyl, decenyl, undecyl, dodecyl, dodecenyl, tridecyl, pentadecyl, pentadecenyl, and octadecyl radicals.

As illustrative of the new compounds and the preparation thereof is the following:

Example I

A mixture of approximately 28.8 parts by weight (substantially 0.2 mol) of 2-amino-4-methyl-6-chloropyrimidine and approximately 37 parts by weight of n-dodecyl amine is heated at 195–205° C. for about 15 hours. Upon cooling the solid mass to about 100° C. approximately 40 parts by weight of n-butyl alcohol is incorporated in the reaction mix and the composite cooled to about room temperature. To the composite is added 4 parts by weight sodium hydroxide in the form of a 14.3% by weight aqueous solution. Thereafter approximately 88 parts by weight of benzene is intimately mixed therein and subsequently about 10 parts by weight of sodium chloride is added thereto while constantly agitating. The benzene layer is separated and the benzene removed by distillation. The crude product is distilled at reduced pressure and at 240–250° C./10 mm. approximately 34.6 parts by weight of a viscous yellow oil is obtained which oil solidifies on cooling. The product is 2-amino-4-methyl-6-n-dodecylaminopyrimidine. (Melting point 80–82° C.)

The mono-hydrochloride salt is obtained by dissolving the 2-amino-4-methyl-6-n-dodecylaminopyrimidine in a mixture of diisopropyl ether and isopropanol, adding to the solution an equimolecular amount of hydrogen chloride, heating the resultant mix, cooling to about 0° C. and separating the crystalline monohydrochloride salt.

Example II

Employing the same reactants of Example I and substantially the same reaction conditions but replacing n-dodecylamine with an equimolar amount of n-decylamine, 47.6 parts by weight of a viscous yellow oil is obtained at 190–191° C./1 mm. which solidifies on cooling. The product is 2-amino-4-methyl-6-n-decylamino-pyrimidine. The solid possesses a melting point of 74–77° C.

The monosuccinic acid salt is obtained by dissolving equimolecular proportions of succinic acid and 2-amino-4-methyl-6-n-decylamino-pyrimidine in isopropyl alcohol, warming the solution, cooling the solution to about 0° C. and separating the salt.

Example III

Employing the same reactants as Example I and substantially the same reaction conditions but replacing n-dodecylamine with an equimolecular amount of 2-ethylhexylamine, 41.5 parts by weight of a viscous yellow oil is obtained at 151–157° C./1 mm. which solidifies on cooling. The product is 2-amino-4-methyl-6-(2'-ethylhexylamino)-pyrimidine. The solid possesses a melting point of 79–81° C.

Example IV

Employing the same reactants as Example I and substantially the same reaction conditions but replacing n-dodecylamine with an equimolecular amount of n-octadecylamine, a good yield of a viscous oily high boiling material is obtained which solidifies on cooling. The product is 2-amino-4-methyl-6-n-octadecylamino-pyrimidine.

The mono-hydrobromide salt is obtained by dissolving the 2-amino-4-methyl-6-n-octadecylamino-pyrimidine in isopropanol, adding to the solution an equimolecular amount of hydrogen bromide, heating the solution, cooling to about 0° C. and separating the mono-hydrobromide salt.

As illustrative of other new compounds of this invention are:

2-amino-4-methyl-6-n-octylamino-pyrimidine
2-amino-4-methyl-6-n-nonylamino-pyrimidine
2-amino-4-methyl-6-n-undecylamino-pyrimidine
2-amino-4-methyl-6-(trimethyloctyl)-pyrimidine
2-amino-4-methyl-6-(2'-butyl-2'-propyl-n-hexylamino) pyrimidine
2-amino-4-methyl-6-(2',2'-dibutyl-n-hexylamino) pyrimidine
2-amino-4-methyl-6-n-pentadecylamino-pyrimidine
2-amino-4-methyl-6-n-hexadecylamino-pyrimidine
2-amino-4-methyl-6-n-octadecylamino-pyrimidine and salts thereof with acids.

The compositions of this invention may be employed as therapeutic agents, either in the form of free bases or in the form of salts thereof with inorganic acids such as hydrochloric acid, hydrobromic acid, sulfuric acid or phosphoric acid or with organic acids such as acetic acid, benzoic acid, salicylic acid, tartaric acid, succinic acid, maleic acid, fumaric acid, lactic acid, gluconic acid or ascorbic acid. The new compositions may be administered for therapeutic purposes either in the form of tablets, creams or injection solutions. The new compositions wherein the 6-position is occupied by a straight chain saturated alkyl group are particularly effective in the treatment of tuberculosis. The compositions of this invention are also useful as activators of rubber vulcanization accelerators.

What is claimed is:

1. A compound of the class consisting of a free base and its salts, said free base having the structure

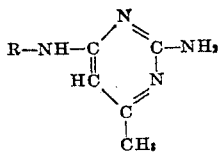

where R is an acyclic hydrocarbon radical containing 8 to 18 carbon atoms.

2. A compound of the class consisting of a free base and its salts, said free base having the structure

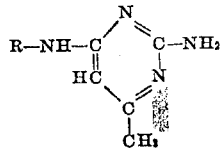

where R is a straight chain saturated alkyl radical containing from 8 to 18 carbon atoms.

3. A compound of the class consisting of a free base and its salts, said free base having the structure

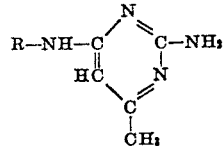

where R is a straight chain acyclic hydrocarbon radical containing from 8 to 18 carbon atoms.

4. 2-amino-4-methyl-6-n-dodecyclamino-pyrimidine.

5. 2-amino-4-methyl-6-n-decyclamino-pyrimidine.

6. 2-amino-4-methyl-6-(2'-ethylhexylamino)-pyrimidine.

7. 2-amino-4-methyl-6-n-octadecylamino-pyrimidine.

References Cited in the file of this patent

UNITED STATES PATENTS

| Number | Name | Date |
|---|---|---|
| 2,139,870 | Williams et al. | Dec. 13, 1938 |

OTHER REFERENCES

Beaker et al., J. A. C. S. 69, 3072–8 (1947) cited in C. A., vol. 42, page 1905h.

Beilsteins Handbuch der Organischen Chemie, vol. 24, p. 345.